(12) United States Patent
Dieterich et al.

(10) Patent No.: US 7,996,234 B2
(45) Date of Patent: Aug. 9, 2011

(54) METHOD AND APPARATUS FOR ADAPTIVE VARIABLE BIT RATE AUDIO ENCODING

(75) Inventors: Charles Benjamin Dieterich, Kingston, NJ (US); Edmond Chalom, Newton, MA (US); Tao Chen, Diamond Bar, CA (US)

(73) Assignee: Akikaze Technologies, LLC, Wilmington, DE (US)

( * ) Notice: Subject to any disclaimer, the term of this patent is extended or adjusted under 35 U.S.C. 154(b) by 1290 days.

(21) Appl. No.: 10/926,572

(22) Filed: Aug. 26, 2004

(65) Prior Publication Data

US 2005/0080622 A1 Apr. 14, 2005

Related U.S. Application Data

(60) Provisional application No. 60/497,815, filed on Aug. 26, 2003.

(51) Int. Cl.
*G10L 21/00* (2006.01)
(52) U.S. Cl. ............ 704/500; 704/219; 375/240.23
(58) Field of Classification Search .......... 704/219, 704/500; 375/240.23
See application file for complete search history.

(56) References Cited

U.S. PATENT DOCUMENTS

| 5,115,469 | A | * | 5/1992 | Taniguchi et al. | 704/228 |
|---|---|---|---|---|---|
| 5,341,457 | A | | 8/1994 | Hall et al. | 704/226 |
| 5,761,634 | A | * | 6/1998 | Stewart et al. | 704/220 |
| 5,862,178 | A | * | 1/1999 | Jarvinen et al. | 375/240 |
| 5,974,380 | A | | 10/1999 | Smyth et al. | 704/229 |
| 6,012,024 | A | * | 1/2000 | Hofmann | 704/219 |
| 6,098,039 | A | * | 8/2000 | Nishida | 704/229 |
| 7,003,449 | B1 | * | 2/2006 | Absar et al. | 704/200.1 |
| 2002/0111800 | A1 | * | 8/2002 | Suzuki et al. | 704/220 |
| 2002/0136296 | A1 | * | 9/2002 | Stone et al. | 375/240.03 |
| 2002/0161576 | A1 | * | 10/2002 | Benyassine et al. | 704/229 |
| 2004/0098267 | A1 | * | 5/2004 | Kikuiri et al. | 704/500 |

FOREIGN PATENT DOCUMENTS

WO WO 2005/020210 A2 3/2005

OTHER PUBLICATIONS

PCT Application No. PCT/US04/027718: International Preliminary Report on Patentability, dated Feb. 27, 2006.
PCT Application No. PCT/US04/027718: International Search Report, dated Feb. 14, 2005.

* cited by examiner

*Primary Examiner* — Daniel D Abebe
(74) *Attorney, Agent, or Firm* — Woodcock Washburn LLP

(57) ABSTRACT

A method and apparatus for producing a variable bit rate audio signal is disclosed. An audio signal is encoded into a plurality of encoded audio signals at different bit rates. A variable bit rate audio signal is produced by selecting between the plurality of encoded audio frames of different bit rates in accordance with a selection criterion.

28 Claims, 4 Drawing Sheets

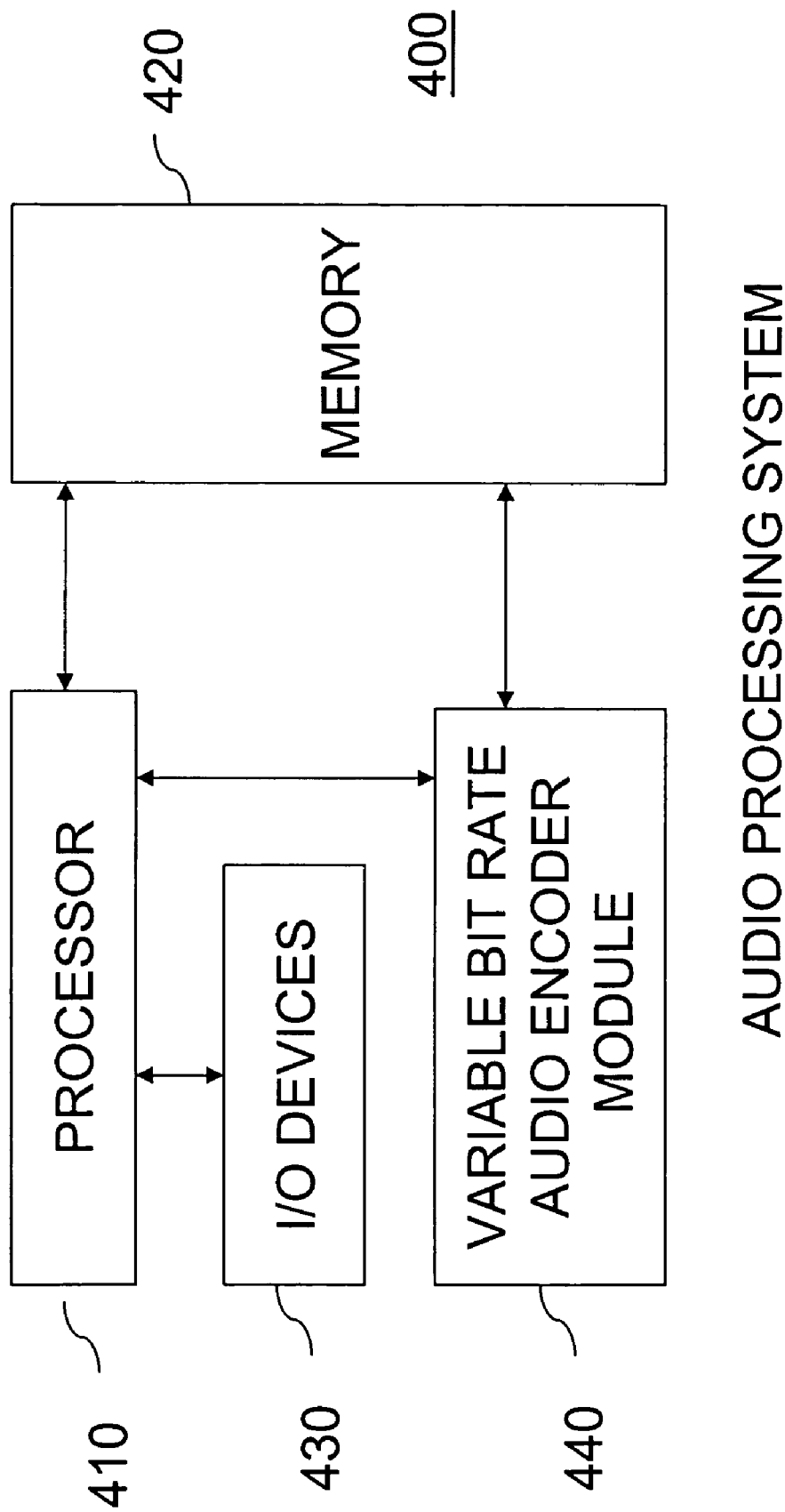

METHOD AND APPARATUS FOR ADAPTIVE VARIABLE BIT RATE AUDIO ENCODING

CROSS-REFERENCE TO RELATED APPLICATIONS

This application claims benefit of U.S. provisional patent application Ser. No. 60/497,815, filed Aug. 26, 2003, which is herein incorporated by reference.

BACKGROUND OF THE INVENTION

As distributors of MPEG-2 transport streams have become more successful at reducing the video bit rate, the fraction of total encoder bit rate used for encoding the audio has increased. Encoded audio is utilized in many applications, including, multiplexed broadcast signals, such as Digital Video Broadcasting (DVB) signals, where several video and audio streams share a constant bit rate of a transmitter or transponder. Encoded audio is also utilized where storage and/or transmission of audio signals, for example via a modem, represents a burden or cost, and minimization of that cost is desired.

Therefore, there is a need in the art for a method and apparatus to reduce the audio bit rate, with minimal or no degradation in quality.

SUMMARY OF THE INVENTION

The present invention generally discloses a method and apparatus for producing a variable bit rate framed audio signal. In one embodiment, an audio signal is encoded into a plurality of encoded audio signals at different bit rates. A variable bit rate audio signal is produced by selecting between the plurality of encoded audio frames of different bit rates in accordance with a selection criterion.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4 illustrates a block diagram of an audio processing device or system in accordance with one embodiment of the present invention.

DETAILED DESCRIPTION

The present invention discloses in one embodiment an encoding system where an audio signal is encoded to produce an encoded audio signal having a variable bit rate. In one embodiment, the system employs a set of audio encoders, each of which encodes the input audio signal at a different constant bit rate. In turn, an analyzer is employed to adaptively select one or more frames from the encoders to form the final output encoded audio signal having a variable bit rate.

The constant bit rate selected for each audio encoder can be application specific. For example, the audio encoding system is able to select from a group of audio signals encoded at different fixed bit rates. The encoded audio signals in the group would range from a "highest" quality encoded signal to a "lowest" quality encoded signal, where the "lowest" quality encoded audio signal would be an encoded audio signal having the lowest bit rate where no noticeable degradation in signal quality can be observed.

Figure 1:
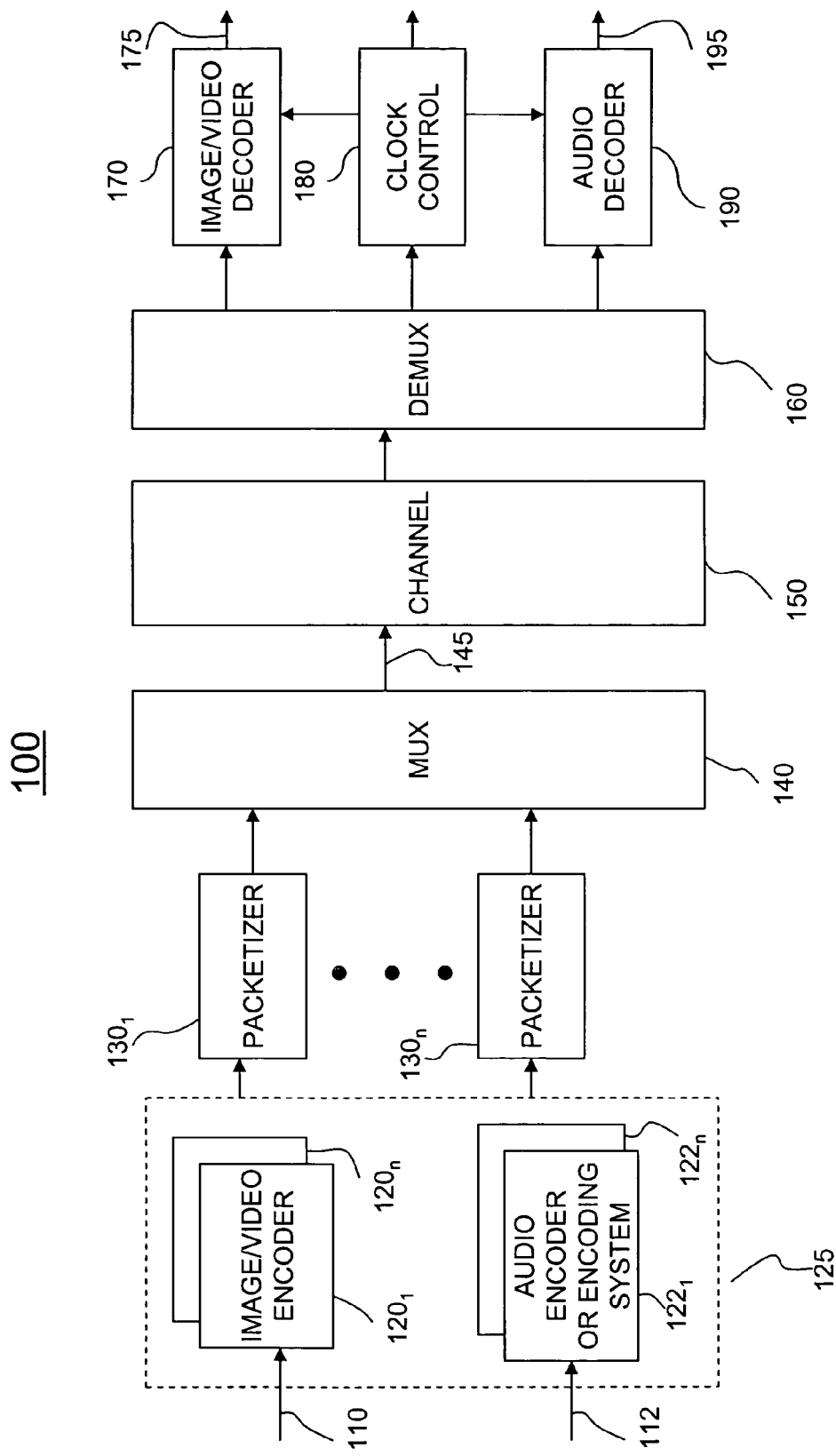
FIG. 1 illustrates a system in accordance with one embodiment of the present invention.

FIG. 1 illustrates an encoding/decoding system 100 of the present invention. System 100 includes an image/video encoder 120 for receiving and encoding video data 110 into an elementary video bitstream. The image/video encoder 120 may be a single image encoder, e.g., a Joint Photographic Experts Group (JPEG) encoder, GIF, PICT, and the like, or an encoder for an image sequence (video), e.g., a block based or wavelet-based image encoder operating in accordance with an MPEG or ATSC standard.

Similarly, the system may include an audio encoder or encoding system 122 for receiving and encoding audio data 112 into an elementary audio bitstream. However, those skilled in the art will realize that a plurality of image/video encoders 120n and audio encoders 122n can be employed to produce a plurality of elementary bitstreams. In fact, the plurality of video and audio encoders can be collectively represented by a server 125, which may employ various encoders and/or may simply contain a plurality (or a library) of stored elementary streams in various storage media. Generally, the output of such server contains interleaved program streams. In one embodiment, the audio encoders produce data compatible with MPEG layer 2 decoding.

In turn, these bitstreams are sent to packetizers 130, where the elementary bitstreams are converted into packets. Information for using the packets independently of the transport stream may be added when the packets are formed. Thus, non-audio/video data are allowed, but they are not shown in FIG. 1. It should be noted that although the present encoder and the packetizer are implemented in a single module, those skilled in the art will realize that the functions performed by the encoder and the packetizer can be jointly or separately implemented as required by a particular application.

The packets are received and multiplexed by the transport stream multiplexer 140 to produce a transport stream 145. Packets constructed from elementary streams that form a program (a group of "Packet Identifiers" (PIDs) with associated video and audio data) generally share a common time base. Thus, the transport stream may contain one or more programs with one or more independent time bases, where the time bases are used for synchronized presentation. The time bases of different programs within a transport stream may be different.

The transport stream 145 is transmitted over a transmission channel 150, which may further incorporate separate channel specific encoder and decoder (not shown). Next, the transport stream 145 is demultiplexed and decoded by a transport stream demultiplexor 160, where the elementary streams serve as inputs to video decoder 170 and audio decoder 190, whose outputs are decoded video signals 175 and audio signals 195, respectively.

Furthermore, timing information is also extracted by the transport stream demultiplexor 160 and delivered to clock control 180 for synchronizing the video and audio decoders with each other and with the channel. Synchronization of the decoders with the channel is accomplished through the use of the "Program Clock Reference" (PCR) in the transport stream. The PCR is a time stamp encoding the timing of the bitstream itself and is used to derive the decoder timing.

Figure 2:
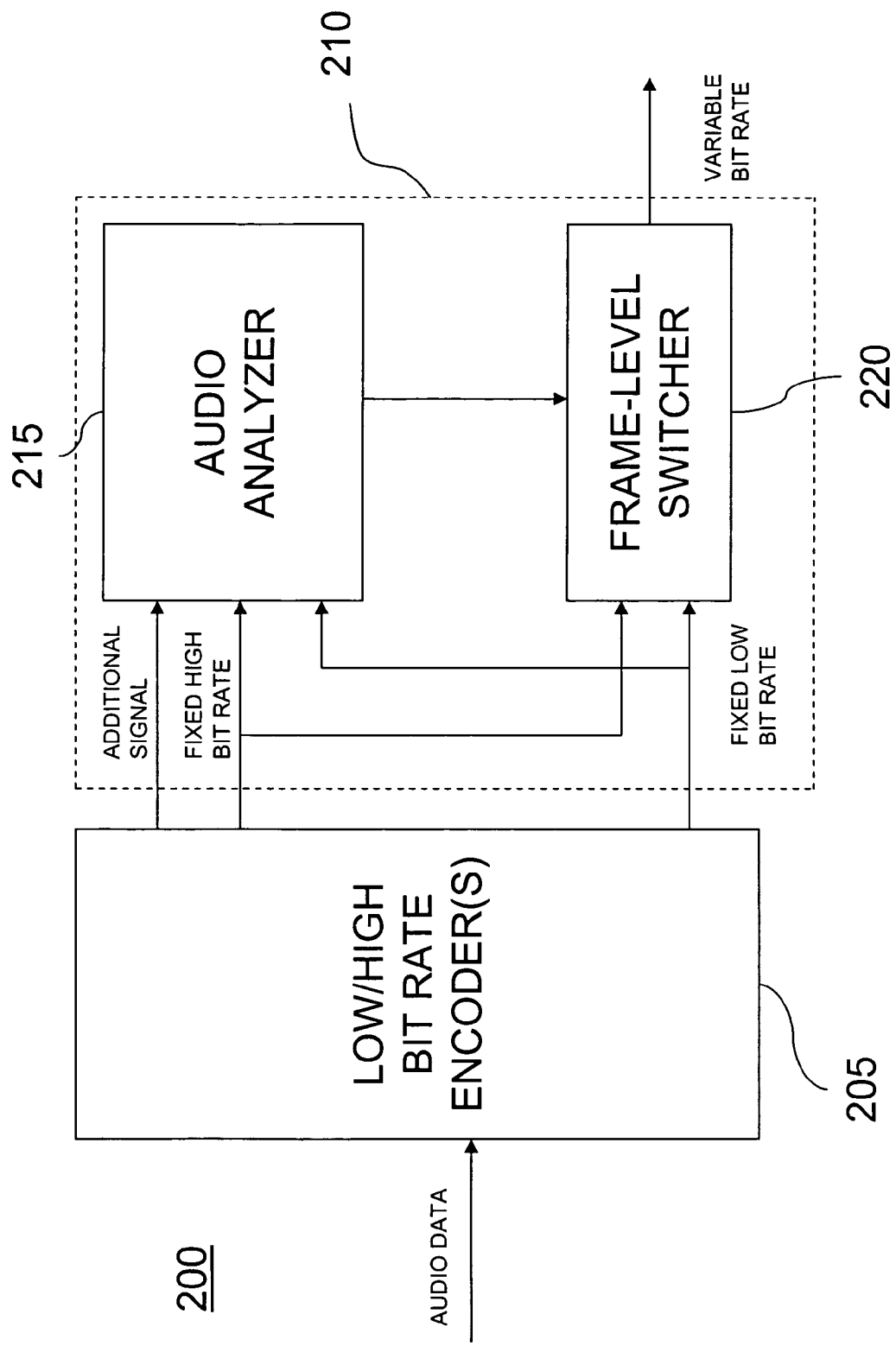
FIG. 2 illustrates a system block diagram of an audio encoding system in accordance with one embodiment of the present invention.

FIG. 2 illustrates a system block diagram of a variable rate audio encoding system 200 in accordance with one embodiment of the present invention, e.g. encoding system 122 of FIG. 1. In operation, the audio encoding system 200 comprises one or more audio encoders 205 and a bit stream or frame selector 210. In one embodiment, one encoder 205 is used to encode an input audio signal into a plurality of encoded time segments of audio, commonly called encoded audio frames. Frames from each encoder have a specified number of bits per encoded frame, producing a bitrate that is substantially constant (in some cases, the number of bits per encoded frame may vary by a small number of bits in a specified pattern, to produce an exact encoded bitrate). Each encoder produces an encoded audio signal comprising a sequence of encoded audio frames at a predetermined bit rate. It would be apparent to one skilled in the art that a plurality of encoders (not shown) may be used to encode at a plurality of bit rates. In either encoder embodiment, the same input audio signal is used in all encoders and the division of the audio signal into frames is identical. Selector 210 takes as inputs at least two compressed audio signals encoded using at least two different bit rates, corresponding to a "high" bit rate signal and at least one "low" bit rate signal. Selector 210 comprises an analyzer 215 and a frame-level switch or switcher 220. Analyzer 215 evaluates one or more frame selection criteria in order to select one or more frames for inclusion in the variable bit rate encoded audio signal. In one embodiment, analyzer 215 comprises an audio analyzer that evaluates level and loudness information of one of the plurality of framed audio signals to determine replacement frame candidates. Frame-level switcher 220 switches between the high bit rate signal and the at least one low bit rate signal in accordance with the selection criterion. The frame-level switcher 220 may have a plurality of inputs, and select between the several signals based on the above criteria. It should be apparent to one skilled in the art that an enhanced encoder (not shown) may select the bit rate, based on the selection criteria, thus eliminating the frame-level switcher 220. It should also be apparent to one of skill in the art that frame level switcher 220 may comprise an "enhanced" switch having the functionality of analyzer 215. The present invention applies to mono, stereo, multi-channel and other audio formats. The present invention also applies to transmission standards (published or proprietary, etc.) that include other data with audio, such as ancillary data in MPEG 1 Layers 1 or 2. The encoders need not be different hardware, but may be multiple passes through the same hardware (or software system).

Figure 3:
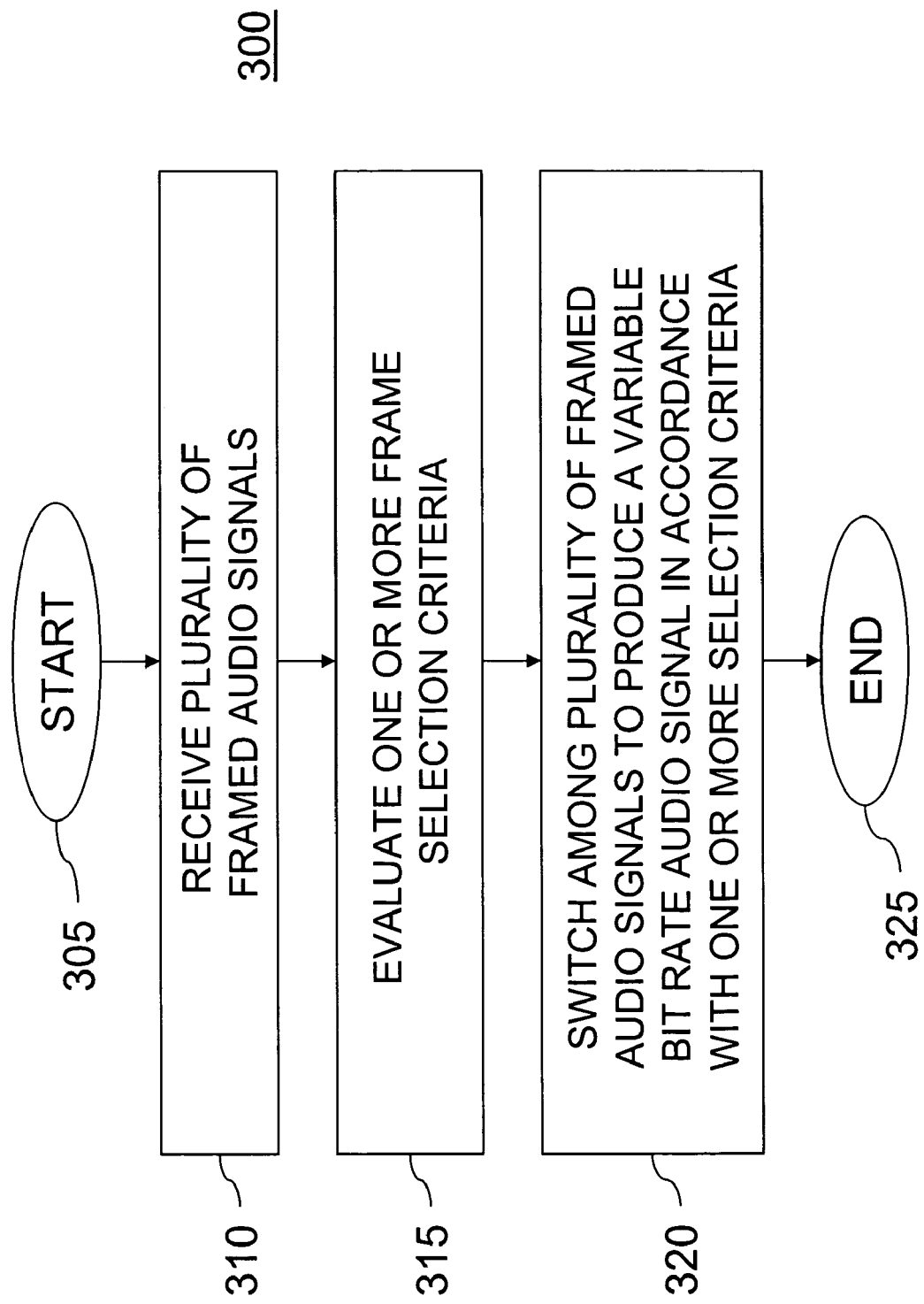
FIG. 3 illustrates a flow diagram in accordance with a method of the present invention.

FIG. 3 illustrates a diagram in accordance with a method 300 of the present invention. Method 300 starts in step 305 and proceeds to step 310. In step 310 a plurality of encoded audio signals at different bit rates is received from encoder(s) 205.

In step 315, one of the plurality of encoded audio signals is analyzed to determine which of the encoded audio signals will be selected to be the output audio signal. The selection can be made on a frame by frame basis or on a plurality of frames.

In one embodiment, the present invention uses level and loudness information to determine which frames have more or less "stress" (i.e., the encoder had trouble encoding the audio waveform) or "activity" (i.e., the audio encoding included a variety of frequency bands, time sub-intervals or other encoding features). The frames with lower activity are more likely to be candidate frames for replacement by compressed data from an encoding of the same audio frame at a lower bit rate. The frames with higher stress are less likely to be candidate frames for replacement by compressed data from an encoding of the same audio frame at a lower bit rate In one embodiment a ranking metric may be utilized to select frames for the variable bit rate audio signal. The following metric is used to determine which frames are the "best" candidates to come from a file with a lower bit rate. In general, frames where encoding distortions are least detectable will be the "best" candidates.

A normalized ranking metric is computed at each frame, over all sub-bands, in a file (or at each frame for a fixed set of frames if streaming) based on both loudness and levels. The ranking metric has values between 0 and 1, where the lower values correspond to lower activity or stress at that frame. The total ranking metric, $R_t$, is calculated based on two individual ranking metrics $R_s$, which is a ranking calculation based on scale factor, and $R_q$, which is a ranking calculation based on the number of quantization levels. Specifically, $R_t = \sqrt{R_s^2 + R_q^2}$, where both $R_s$ and $R_q$ are a single value per frame, and are computed based over all sub-bands in that frame. The calculation for $R_s$ and $R_q$ is computationally similar, except that they are calculated with differing underlying data.

By looking at the quantization levels, Q, of a specific sub-band over all the frames in a file, a normalized ranking scale (between 0 and 1) is computed based on the number of different values (of Q) encountered in that sub-band. So if there are N different values, over all the frames, then the values are sorted as $V_1, V_2, \ldots, V_i, \ldots, V_N$ in increasing order and assign a normalized rank $$R_q^k = \frac{i-1}{N-1}$$

at each frame that has $Q=V_i$ in sub-band k. Finally, $$R_q = \frac{1}{B} \sum_{k=1}^{B} R_q^k,$$

is the normalized rank based only on the number of quantization levels, over all sub-bands, computed at each frame. For example, suppose that there are six different quantization levels (e.g. 7, 15, 31, 63, 127, and 255) used at sub-band 0, over all the frames in an audio file. Then the normalized quantization rank (at sub-band 0) at all frames that has a value of 31 (for the number of quantization levels) would be 0.4.

Computing $R_s$, the rank calculation based on scale factor, is similar. Note that if the scale factor index is used (as our underlying data) then the values are sorted in decreasing order, whereas if the actual scale factor is used, then the values are sorted in increasing order. In other words, lower scale factor corresponds to lower activity (as did frames with lower number of quantization levels). By looking at the scale factor, S, of a specific sub-band over all the frames in a file, a normalized ranking scale (between 0 and 1) is computed based on the number of different values (of S) encountered in that sub-band. So if there are N different values, over all the frames, then the values are sorted as $V_1, V_2, \ldots, V_i, \ldots, V_N$ in increasing order and assign a normalized rank $$R_s^k = \frac{i-1}{N-1}$$

at each frame that has $S=V_i$ in sub-band k. Finally, $$R_s = \frac{1}{B}\sum_{k=1}^{B} R_s^k,$$

is the normalized rank based only on the number of quantization levels, over all sub-bands, computed at each frame.

Alternatively, audio encoders are designed to encode the input audio signal in accordance with certain parameters and/or models. These parameters and/or models can be exploited by the present invention to effect selection of audio frames to produce a variable bit rate audio signal. Values created within the encoder during audio frame encoding can indicate the level of encoding stress.

In one embodiment, the selection of frames for the variable bit rate audio signal may be made using a fixed selection criterion. For example, encoder 205 may provide an additional signal with the low bit rate signal. This additional signal indicates whether a psychoacoustic demand of an encoder was met. For example, ISO/IEC 11172-3, "Information technology—Coding of moving pictures and associated audio for digital storage media at up to about 1.5 Mbit/s—Part 3: Audio", section 1.1.1.3, teaches the use of a psychoacoustic model. The psychoacoustic demand is a variable that is derived from an audio signal that has been encoded using a psychoacoustic encoder. A bit or noise allocator looks at both the output samples from a filterbank and signal to mask ratio's (SMR's) from a psychoacoustic model and adjusts the bit allocation or noise allocation in order simultaneously to meet both the bitrate requirements and the masking requirements. At low bit rates, these methods attempt to spend bits in a fashion that is psychoacoustically inoffensive when they cannot meet the psychoacoustic demand at the required bit rate. Thus, an audio encoder in encoding the input audio signal, is able to determine on a frame by frame basis whether each encoded frame will meet the psychoacoustic demand. For example, if a psychoacoustic demand of the low bit rate signal is met, frame-level switcher 220 will switch to the low bit rate audio signal. Namely, since the lower bit rate used to encode the audio signal is adequate to satisfy the psychoacoustic demand, then it is unnecessary to use the high bit rate version of the audio signal. This useful information can be exploited to control the switch 220 of the present invention. If the psychoacoustic demand of the low bit rate signal is not met, frame-level switcher 220 will switch to the high bit rate audio signal. Namely, since the lower bit rate signal has failed the psychoacoustic demand, use of the lower bit rate signal will produce detectable audio defects in the decoded audio signal at the decoder. Thus usage of the low bit rate encoded signal should be avoided.

In one embodiment, a mask to noise ratio (MNR) may be used to select frames for the variable bit rate audio signal. ISO/IEC 11172-3, "Information technology—Coding of moving pictures and associated audio for digital storage media at up to about 1.5 Mbit/s—Part 3: Audio", section 1.5.1.6, teaches a method for obtaining the MNR of an audio signal. The frame-level switcher can compare the MNR of the lower bit rate signal with a fixed or variable threshold, and select between the two rates based on that comparison. The threshold may be changeable by an operator, or may be set based on program material or other demands within the broadcast multiplex.

In step 320, a variable bit rate audio signal is produced by switching among the plurality of framed audio signals in accordance with the one or more selection criteria. Method 300 ends at step 325.

In some circumstances, the switching between audio rates may cause additional distortion to the output signal, not present in decodings of either of the two compressed audio streams. In this case, minimization of switching events is desirable. The frame-level switcher 220 may include an algorithm to minimize the number of switching events, for example, the minimum required time spent at one of the data rates, or simply a minimum number of frame periods spent at the higher rate. This is an example of a system with memory.

Memory systems may also tolerate a number of events where the "psychoacoustic demand" is not met, e.g., maintaining the usage of the low bit rate signal (e.g., a default setting) before switching to the higher rate. Similarly, methods of using several MNR values to determine when to switch rates can also be employed. For example, if three of the last 10 MNR values are below a threshold, a switch to the higher rate would be executed.

If joint rate control is used for several audio streams, a successive approximation technique may be utilized. The successive approximation technique involves encoding a plurality of audio signals at initial individual bit rates, measuring aggregate frame rate. If the aggregate bit rate is higher than the target aggregate bit rate, parameters, such as the threshold in 220, for the encoders are modified to lower the next time period's aggregate bit rate.

If an audio quality value, or similar, is desired, a single audio stream can use successive approximation to determine optimum frame data rates. An initial rate is chosen, then quality measured. If too poor, a higher rate is tried, if too good, a lower rate is tried. The ranges of rates may be otherwise restricted to prevent unacceptable pops and clicks.

While embodiments of the present invention have not discussed specific frame rates, it should be apparent to one of skill in the art that there is no fixed "frame rate" in audio coding, as in video coding. In audio coding, frame rate is dependent on the sampling rate. A frame in the MPEG-1 Layer I and II has 384 and 1152 samples, respectively. These numbers are fixed. In the case of 44.1 kHz, the frame rate of Layer II is 44100/1152=38.28 fps, and in the case of 48 kHz, it then becomes 41.67 fps. The present invention specifically applies to switching between encoders operating at identical and synchronized frame rates. MPEG-1 Layer I and II are constant bitrate systems, but decoders allow the bitrate to change between audio segments with the same frame rate. Clicks, pops or other distortions may be produced in the output audio when these transitions are detected in the bitstream.

Other methods using psychoacoustic estimates of audibility may also be used. For example, the audibility of encoding noise relative to the click caused by the bitrate change may be factored into the decision to change bitrates.

The choice of thresholds for several audio signals, sharing a signal multiplex may be set jointly by a statistical multiplexing circuit that observes the criteria from each audio signal's encoders. Rate choices would be set to maximize the minimum value of MNR for all channels, or other criteria, such as minimizing rate transitions (i.e., only maximizing the minimum MNR over channels which have been at a fixed bitrate for some number of frames), could be used.

FIG. 4 illustrates a block diagram of an audio processing device or system 400 of the present invention. Specifically, the system can be employed to adaptively and intelligently switch between a high quality and at least one low quality version of an audio signal. In one embodiment, the audio processing device or system 400 is implemented using a general purpose computer or any other hardware equivalents.

Thus, audio processing device or system 400 comprises a processor (CPU) 410, a memory 420, e.g., random access memory (RAM) and/or read only memory (ROM), variable bit rate audio encoder module 440, and various input/output devices 430, (e.g., storage devices, including but not limited to, a tape drive, a floppy drive, a hard disk drive or a compact disk drive, a receiver, a transmitter, a speaker, A/D and D/A converters.

It should be understood that the variable bit rate audio encoder module 440 can be implemented as one or more physical devices that are coupled to the CPU 410 through a communication channel. Alternatively, the variable bit rate audio encoder module 440 can be represented by one or more software applications (or even a combination of software and hardware, e.g., using application specific integrated circuits (ASIC)), where the software is loaded from a storage medium, (e.g., a magnetic or optical drive or diskette) and operated by the CPU in the memory 420 of the computer. As such, the variable bit rate audio encoder module 440 (including associated data structures) of the present invention can be stored on a computer readable medium, e.g., RAM memory, magnetic or optical drive or diskette and the like.

While the foregoing is directed to embodiments of the present invention, other and further embodiments of the invention may be devised without departing from the basic scope thereof, and the scope thereof is determined by the claims that follow.

The invention claimed is:

1. A method for producing a variable bit rate audio signal, comprising:
encoding at a first bit rate an audio signal into a first encoded audio signal and encoding at a second bit rate the audio signal into a second encoded audio signal, wherein each of said encoded audio signals comprises a plurality of encoded audio frames;
comparing level and loudness information of at least one encoded frame of the first encoded audio signal and at least one encoded frame of the second encoded audio signal to a threshold; and
selecting either the first encoded audio signal or the second encoded audio signal in accordance with said comparing and a selection criterion, wherein the selection criterion is based upon the level and loudness information of either the first encoded audio signal or the second audio encoded signal.

2. The method of claim 1, wherein the first bit rate comprises a fixed high bit rate and the second bit rate comprises a low bit rate.

3. The method of claim 2, further comprising generating an additional signal indicative of whether the selection criterion is satisfied for at least one of said plurality of encoded frames of said second encoded audio signal.

4. The method of claim 3, wherein said selection criterion comprises a mask to noise ratio.

5. The method of claim 4, wherein said selecting comprises:
comparing said mask to noise ratio of at least one encoded frame of the second encoded audio signal to a threshold; and
selecting an encoded audio frame from said first encoded audio signal or said second encoded audio signal in accordance with whether said mask to noise ratio exceeds said threshold.

6. The method of claim 4, wherein said selecting said audio frames from said first audio signal is performed only after a minimum number of audio frames of said second encoded audio signal fall below a threshold for said mask to noise ratio.

7. The method of claim 5, wherein said threshold is fixed.

8. The method of claim 5, wherein said threshold is variable.

9. The method of claim 1, wherein said selecting is performed such that a number of switching events between said first encoded audio signal and said second encoded audio signal within a predefined period is substantially minimized.

10. The method of claim 9, wherein said predefined period requires selecting audio frames of one bit rate for a minimum time period.

11. The method of claim 1, wherein joint rate control is used for the plurality of encoded audio frames.

12. The method of claim 1, wherein said selection criterion is based upon a ranking metric.

13. The method of claim 12, wherein said ranking metric is normalized.

14. The method of claim 13, wherein said ranking metric is computed for each of the plurality of encoded audio frames.

15. The method of claim 14, wherein said ranking metric is computed over sub-bands for each of the plurality of encoded audio frames.

16. The method of claim 15, wherein said ranking metric comprises a scale factor ranking metric and a quantization ranking metric.

17. The method of claim 16, wherein said quantization ranking metric is determined based on quantization levels of a selected sub-band of the plurality of encoded audio frames.

18. The method of claim 16, wherein said scale factor ranking metric is determined based on scale factors of a selected sub-band of the plurality of encoded audio frames.

19. A method for producing a variable bit rate audio signal, comprising:
encoding at different bit rates an audio signal into a plurality of encoded audio signals, wherein each of said encoded audio signals comprises a plurality of encoded audio frames, wherein a first encoded audio signal of said plurality of encoded audio signals comprises a fixed high bit rate audio signal and a second encoded audio signal of said plurality of encoded audio signals comprises a low bit rate audio signal, wherein said plurality of encoded audio signals further comprises an additional signal indicative of whether a selection criterion is satisfied for at least one of said plurality of encoded audio frames of said second encoded audio signal, wherein said selection criterion comprises a psychoacoustic demand; and
selecting between said plurality of encoded audio frames of different bit rates to produce said variable bit rate audio signal in accordance with said selection criterion.

20. The method of claim 19, wherein said selecting comprises:
selecting audio frames from said first encoded audio signal when the psychoacoustic demand of said second encoded audio signal is not met; and
selecting audio frames from said second encoded audio signal when the psychoacoustic demand of said second encoded audio signal is met.

21. The method of claim 20, wherein said selecting said audio frames from said first audio signal is performed only after a minimum number of audio frames of said second encoded audio signal fail said psychoacoustic demand.

22. A tangible computer-readable medium having stored thereon a plurality of instructions for producing a variable bit rate framed audio signal, said instructions comprising:
instructions for encoding at a first bit rate an audio signal into a first encoded audio signal and encoding at a second bit rate the audio signal into a second encoded audio signal, wherein each of said encoded audio signals comprises a plurality of encoded audio frames;
instructions for comparing level and loudness information of at least one encoded frame of the first encoded audio signal and at least one encoded frame of the second encoded audio signal to a threshold; and
instructions for selecting either the first encoded audio signal or the second encoded audio signal in accordance with said comparing and a selection criterion, wherein said selection criterion is based upon the level and loudness information of either the first encoded audio signal or the second encoded audio signal.

23. A system for producing a variable bit rate framed audio signal, the system comprising a processor and memory, the system configured to:
encode at a first bit rate an audio signal into a first encoded audio signal and encode at a second bit rate the audio signal into a second encoded audio signal, wherein each of said encoded audio signals comprises a plurality of encoded audio frames;
compare level and loudness information of at least one encoded frame of the first encoded audio signal and at least one encoded frame of the second encoded audio signal to a threshold; and
select either the first encoded audio signal or the second encoded audio signal in accordance with said comparing and a selection criterion, wherein said selection criterion is based upon the level and loudness information of either the first encoded audio signal or the second encoded audio signal.

24. A system for producing a variable bit rate audio signal, the system comprising a processor and memory, the system configured to:
encode an audio signal into a plurality of encoded audio signals of different bit rates, wherein each of said encoded audio signals comprises a plurality of encoded audio frames, wherein a first encoded audio signal of said plurality of encoded audio signals comprises a fixed high bit rate audio signal and a second encoded audio signal of said plurality of encoded audio signals comprises a low bit rate audio signal, wherein said plurality of encoded audio signals further comprises an additional signal indicative of whether a selection criterion is satisfied for at least one of said encoded frames of said second encoded audio signal, wherein said selection criterion comprises a psychoacoustic demand; and
select between said plurality of encoded audio frames of different bit rates to produce said variable bit rate audio signal in accordance with said selection criterion.

25. A system for producing a variable bit rate audio signal, the system comprising a processor and memory, the system configured to:
encode an audio signal into a plurality of encoded audio signals of different bit rates, wherein each of said encoded audio signals comprises a plurality of encoded audio frames, wherein a first encoded audio signal of said plurality of encoded audio signals comprises a fixed high bit rate audio signal and a second encoded audio signal of said plurality of encoded audio signals comprises a low bit rate audio signal, wherein said plurality of encoded audio signals further comprises an additional signal indicative of whether a selection criterion is satisfied for at least one of said encoded frames of said second encoded audio signal, wherein said selection criterion comprises a mask to noise ratio; and
select between said plurality of encoded audio frames of different bit rates to produce said variable bit rate audio signal in accordance with said selection criterion.

26. A system for producing a variable bit rate framed audio signal, the system comprising a processor and memory, the system comprising:
means for encoding at a first bit rate an audio signal into a first encoded audio signal and encoding at a second bit rate the audio signal into a second encoded audio signal, wherein each of said encoded audio signals comprises a plurality of encoded audio frames;
means for comparing level and loudness information of at least one encoded frame of the first encoded audio signal and at least one encoded frame of the second encoded audio signal to a threshold; and
means for selecting either the first encoded audio signal or the second encoded audio signal in accordance with said comparing and a selection criterion, wherein the selection criterion is based upon level and loudness information of either the first encoded audio signal or the second encoded audio signal.

27. The system of claim 26, wherein the first bit rate comprises a fixed high bit rate and the second bit rate comprises a low bit rate.

28. The system of claim 26, further comprising means for generating an additional signal indicative of whether the selection criterion is satisfied for at least one of said plurality of encoded frames of said second encoded audio signal.

* * * * *

UNITED STATES PATENT AND TRADEMARK OFFICE
CERTIFICATE OF CORRECTION

| | |
|---|---|
| PATENT NO. | : 7,996,234 B2 |
| APPLICATION NO. | : 10/926572 |
| DATED | : August 9, 2011 |
| INVENTOR(S) | : Dieterich et al. |

It is certified that error appears in the above-identified patent and that said Letters Patent is hereby corrected as shown below:

Column 8, line 30, in Claim 15, delete "sub- bands" and insert -- sub-bands --, therefor.

Signed and Sealed this
Tenth Day of January, 2012

David J. Kappos
*Director of the United States Patent and Trademark Office*